United States Patent [19]

Saxon et al.

[11] Patent Number: 5,278,953
[45] Date of Patent: Jan. 11, 1994

[54] MACHINE TOOL FIXTURE COMPUTER AIDED SETUP

[75] Inventors: C. Rogers Saxon, Granada Hills; David B. Pickels, Santa Ana, both of Calif.

[73] Assignee: Aura Systems, Inc., El Segundo, Calif.

[21] Appl. No.: 790,653

[22] Filed: Nov. 8, 1991

[51] Int. Cl.$^5$ .............................................. G06F 15/62
[52] U.S. Cl. ..................................... 395/161; 395/100
[58] Field of Search ...................... 395/155, 161, 100; 364/146, 148, 149, 188, 190, 192, 193, 194, 474.01, 474.02, 474.05, 474.11, 474.18, 474.2, 474.22, 474.24, 474.26, 474.27, 474.28, 474.34, 474.35, 474.36, 468, 512

[56] References Cited

U.S. PATENT DOCUMENTS

| | | | |
|---|---|---|---|
| 4,591,989 | 5/1986 | Tanaka | 364/474.22 X |
| 4,627,003 | 12/1986 | Kishi et al. | 364/474.22 X |
| 4,939,635 | 7/1990 | Seki et al. | 364/474.26 X |
| 5,033,014 | 7/1991 | Carver et al. | 364/474.24 X |
| 5,115,400 | 5/1992 | Watanabe et al. | 364/474.21 |
| 5,121,333 | 6/1992 | Riley et al. | 364/474.2 X |

*Primary Examiner*—Heather R. Herndon
*Attorney, Agent, or Firm*—Anthony T. Cascio; Lisa A. Clifford

[57] ABSTRACT

A video image of the article to be produced is displayed on a computer. A first geometric shape is developed to enclose fully the video image of the article. The first geometric shape provides a video image of a workpiece of machinable stock and the approximate unscaled dimensions of the workpiece. A selection is made from a library of known machine tool tables to select the exact type of machine tool table to be used to produce the article. The video image of the table is positioned visually underneath each of the video image of the article and first geometric shape. The video representation of the machine tool table includes a frame of reference origin which corresponds to the actual machine tool table zero reference. The library also includes the various locating, fastening and holding devices used with each type of machine tool table from which symbols representing these devices can be selected, displayed and positioned on the terminal in their working relationship with respect to the displayed image of the workpiece. The input device is again used to form a second geometric shape fully enclosing the video image of the article, the first geometric shape and any displayed symbol, and further being itself enclosed by the video representation of the table. The second geometric shape provides a video image of a fixture subplate, its approximate dimensions and its approximate location on the machine tool table. From the predefined frame of reference for the displayed representation of the machine tool table and a predefined location point for each displayed device symbol, compute a set of data points which correspond to the actual distance of each device to be used in the fixture from the machine table zero reference. The data is utilized to program the numerical controller of the machine tool to machine a piece of material mounted to the machine tool table in the approximate unscaled dimension and location of the second geometric shape as displayed on the video display terminal to form the subplate.

6 Claims, 5 Drawing Sheets

MACHINE TOOL FIXTURE COMPUTER AIDED SETUP

FIELD OF THE INVENTION

The present invention relates generally to computer aided design/computer aided manufacturing (CAD/CAM) and more particularly to a novel machine tool fixture computer aided setup (CAS) method for automating the design of the fixture and its set up on the machine tool table.

BACKGROUND OF THE INVENTION

It has become common to produce an article of manufacture through a process or system which is typically referred to as computer aided design and computer aided manufacturing (CAD/CAM). Through the use of computer systems programmed with CAD/CAM software, the time necessary to engineer, prototype and manufacture an article of manufacture has been substantially reduced.

The CAD software allows the designer to visualize a dimensionally scaled image of the article to be manufactured on a video display terminal of the computer which contains the CAD software. Through use of the CAD software, the designer can then engineer the article by acting only on the displayed video image of the article. With each iteration in the design sequence, the CAD software will calculate useful information regarding the article and graphically display such information. This information may include, inter alia, geometries of the article, such as size, shape, dimensions and points of intersection, and relevant textual information concerning the article. The information is generally displayable in conjunction with the video representation.

By reviewing the video image of the article and any displayed information, the designer can, over one or more iterations, interactively modify the video image and review the modifications in conjunction with the updated information. The final iteration results in an enhanced and perfected design of the article. The CAD software can then develop digital data which defines or describes the final design and from which the article can be manufactured. The data may be stored in any appropriate medium.

The data is interpreted by the CAM software and a machine tool operator to program a machine tool numerical controller with a set of (x,y,z) data points and the action to occur between each data point, such as the cutting tool path and the tool selection for example, to develop a machining sequence. The (x,y,z) data is usually referenced from a frame of reference origin within a machine table fixture which holds the machinable stock from which the article is fabricated during the machining sequence.

The fixture in turn is mounted to the machine tool table which has its own frame of reference origin. In the prior art, considerable time and effort is expended in the set up or design of the fixture and its proper location upon the machine tool table to obtain the correct offset between the fixture and table frame of reference origins. Following is an exemplary description of a typical prior art fixture set up procedure.

The set up man and numerical controller programmer first need to discuss how the article is to be held for machining, the location of the fixture frame of reference origin and part orientation, and how the programmer will program the machining sequence so as not to damage the fixture. The set up man then calculates the location of alignment pins, clamps and hold down bolts from the fixture reference frame origin. The subplate stock for the fixture must be cut and placed on the machine table. The machinist needs to accurately align the fixture subplate on the table by using a precision indicator and soft hammer. Once the subplate is properly located it is clamped into place and the numerical controller programmed with the hole locations for the dowel pins and other holding devices. The machine tool reference frame origin must be referenced very accurately to the fixture reference frame origin so that the hole locations in the subplate are machined in the calculated positions. However, this step is accomplished by manually jogging the machine tool from the table reference origin and visually placing it at the fixture reference origin and setting this offset between each reference origin into the controller. After the subplate is machined and the pins, clamps and stock are affixed thereto, the numerical controller may then be programmed with the machining sequence program for the article.

Therefore, a significant disadvantage and limitation of the prior art fixture setup procedure exists in the need to manually align the fixture on the machine tool table and further manually referencing the fixture reference origin to the machine tool table reference origin. Of course, the offset between the reference origins can only be calculated as precisely as the machinist "eyeballing" the fixture reference origin when placing the machine tool over it and the scale of the measuring instrument used to measure the distance between each reference origin.

Various prior art methods and apparatus have been developed for machine tool table fixture set up. The known prior art is as follows: U.S. Pat. No. 4,645,391 for Work Set Up Method and Apparatus; U.S. Pat. No. 4,168,464 for Set Point Sensing System for Numerically Controlled Machine Tools; U.S. Pat. No. 4,073,215 for Subplate Assembly for Machine Tools; and U.S. Pat. No. 3,867,763 for Setting Fixture for Machine Tools.

SUMMARY OF THE INVENTION

It is therefore an important object of the present invention to overcome one or more disadvantages and limitations of the prior art.

It is a primary object of the present invention to automate fixture setup.

It is a further object of the present invention to eliminate precision positioning the fixture subplate on the machine tool table.

These and other objects of the present invention are met by a novel machine tool fixture computer aided setup (CAS) method. The CAS method is contemplated as an enhancement for traditional CAD/CAM software by the inclusion of a library or database of known machine tool tables.

According to the present invention, a dimensionally scaled video image of the article to be produced is displayed on a video display terminal of a computer which contains the CAS library. Through use of an input device of the computer, a first geometric shape is developed for display on the terminal to enclose fully the video image of the article. Accordingly, the first geometric shape will provide a video image of a workpiece of machinable stock and the approximate unscaled dimensions of the workpiece from which the article will be machined. A selection is made from a library of known machine tool tables to select the exact type of machine tool table to be used to produce the article. The library is stored as digital data and the selection therefrom is converted to a scaled video representation of the machine tool table for display on the terminal. The video representation of the table is positioned visually underneath each of the video image of the article and first geometric shape. The video representation of the machine tool table includes a displayable predefined frame of reference origin which corresponds to the actual machine tool table zero reference. The library of machine tool tables also includes in its digital data the various locating, fastening and holding devices used with each type of machine tool table from which symbols representing these devices can be selected, displayed and positioned on the terminal in their working relationship with respect to the displayed image of the workpiece. The input device is again used to form a second geometric shape fully enclosing the video image of the article, the first geometric shape and any displayed symbol, and further being itself enclosed by the video representation of the table. Accordingly, the second geometric shape provides a video image of a fixture subplate, its approximate dimensions and its approximate location on the machine tool table. The CAD software can, from the predefined frame of reference for the displayed representation of the machine tool table and a predefined location point for each displayed device symbol, compute a set of (x,y,z) data points which correspond to the actual distance of each device to be used in the fixture from the machine table zero reference. The (x,y,z) data is utilized by an operator to program the numerical controller of the machine tool to machine a piece of material mounted to the machine tool table in the approximate unscaled dimension and location of the second geometric shape as displayed on the video display terminal. The nature of the machining at each data point is performed in accordance with the type of device to be used at each data point as displayed by its symbol on the video display terminal.

An important feature of the present invention is the "part outward" design of the fixture through the CAD software. By displaying a video image of the part to be machined on the video display terminal, the fixture can be designed around the part through use of the terminal. Once all locating pins, clamps and hold down bolts are located on the display terminal, the subplate is drawn, as the second geometric shape, on the video terminal to enclose all of the symbols and images, except for the representation of the table, which defines the working boundary. From the location of all device symbols as displayed, the CAD software computes the precise location of the corresponding devices used in the fixture set up from the machine table zero reference, and not a fixture reference origin as in the prior art. It is only from use of the data in the CAS library with the CAD/CAM software that the method of the present invention may be practiced. When practicing the present invention, the operator need only mount a subplate of the approximate dimension as determined by the second geometric shape in the approximate location shown on the display terminal and machine it in accordance with the developed (x,y,z) data so that the devices may be attached thereto. Therefore, the present invention possesses a clear advantage over the prior art requirement of positioning exactly the subplate and then measuring an offset between the table and subplate reference origins prior to its machining and fixture set up.

A further feature of the present invention is that the data used to display the video image of the article may be obtained from any of the CAD, CAM or NC data which describe the article. This data will also contain its own zero reference. The CAD software can then compute an exact offset between the machine table zero reference provided by the CAS data and the zero reference for the article data so that machining of the workpiece can commence immediately upon fixture setup.

These and other objects, advantages and features of the present invention will become readily apparent to those skilled in the art from a study of the following Description of an Exemplary Preferred Embodiment when read in conjunction with the attached Drawing and appended Claims.

DESCRIPTION OF AN EXEMPLARY PREFERRED EMBODIMENT

Figure 1:
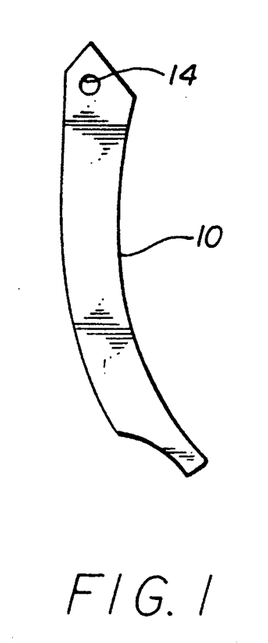
FIG. 1 is a view showing a video image of an exemplary article of manufacture as it would appear on a video display terminal.

Referring to FIG. 1, there is shown a dimensionally scaled video image 10 of an article of manufacture as it would appear on a video display terminal of a computer (not shown). It is to be initially understood that the present invention is directed to the computer aided setup of the fixture which holds the machinable stock workpiece during the machining sequence to produce the article which is displayed as the video image 10, and not to the machining of the article itself. Accordingly, the shape of the article representation 10 is chosen to be merely exemplary in the following description of the software implemented machine tool fixture computer aided set up (CAS) method of the present invention in that it contains surfaces which are parallel to the axes of an x,y coordinate system, surfaces which are at angles to these axes and surfaces which are arcuate or curvilinear. The method for accommodating these various surfaces in fixture set up will be described in detail hereinbelow. It will therefore become apparent from the following description that the CAS method of the present invention can be practiced to design, construct and set up a machine tool table fixture for the machining of any shape of article.

Figure 2:
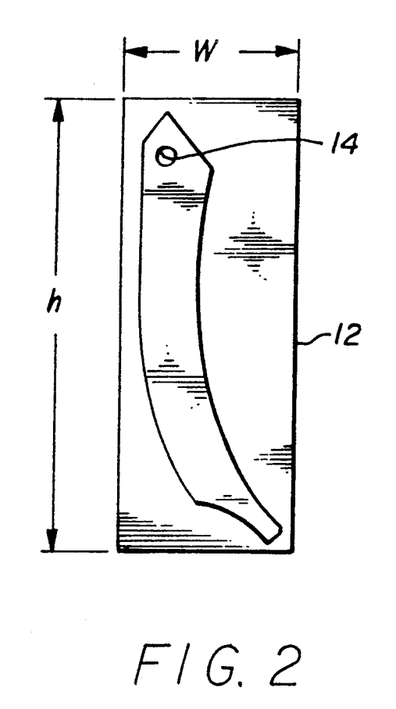
FIG. 2 is a view showing the video image of FIG. 1 as enclosed by a first geometric figure which is useful for sizing the workpiece from which the article will be machined.

The video image 10 of the article to be machined may be developed from data generated from the CAD/CAM software modules or from the numerical controller (NC) program as is well known. Using the graphics capabilities of the CAD software in conjunction with an input device (not shown), such as a mouse, touch sensitive screen, light wand, keyboard or the like, of the computer a first geometric shape 12 is drawn on the display terminal. As best seen in FIG. 2, the first geometric shape 12 fully encloses the video image 10.

The first geometric shape 12 is useful for obtaining the unscaled dimensions of a workpiece of machinable stock from which the article is to be machined. In the exemplary article shown and for most articles, a simple rectangular shape is sufficient. A feature of CAD software is its usefulness for displaying the unscaled dimensions of the first geometric shape 12. In the example shown for the rectangular shape, a height, h, and a width, w, would be displayed. Although the computer has the capability of generating high precision numbers for the unscaled dimensions of generating high precision numbers for the unscaled dimensions of the first geometric shape 12, the operator need only provide a workpiece in the approximate dimension generated, such as to the nearest one-eighth inch. This feature of the present invention of being able to approximate the size of the workpiece (and subplate as hereinbelow described) is an important advantage over the prior art and is only possible with the "part outward" fixture design of the CAS method described herein.

Once the size of the workpiece has been determined, the video image 10 of the article is examined to determine if during machining of the article it would have to be repositioned, reorientated or have its affixing to the fixture subplate changed. For the exemplary article, shown as the video image 10, there is a single hole within the article. This hole is represented on the video display as a circle 14. An article with a single hole cannot be machined in a single pass, since upon removal of the workpiece stock during machining there would be insufficient affixing by a single bolt disposed through the hole to hold the article to the fixture subplate. During machining the workpiece could rotate about this bolt resulting in a defective or unusable article. Therefore, the partially machined workpiece needs to be reorientated during machining.

Figure 3:
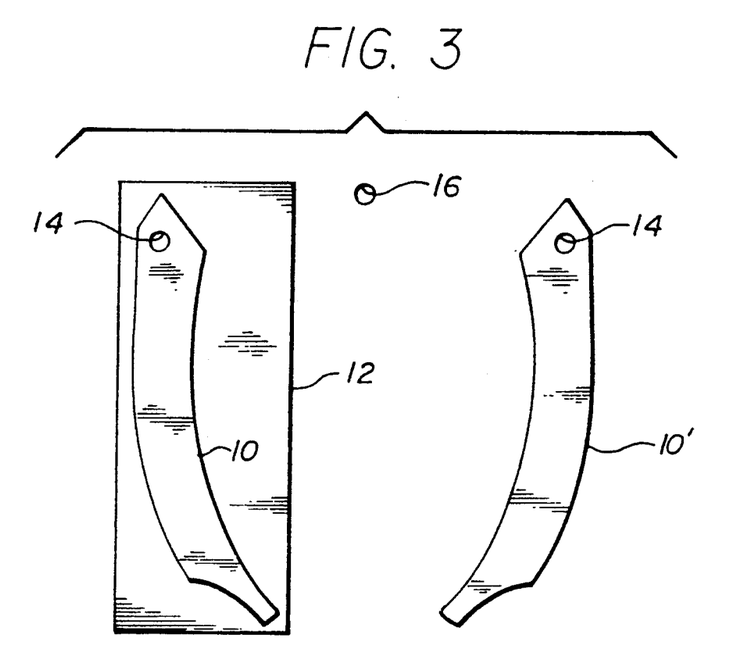
FIG. 3 is a view similar to FIG. 2 showing an addition of a video mirror image of the article.

To accommodate this reorientation in the CAS method of the present invention, the CAD software is used to produce a video mirror image 10' of the article about a point of symmetry 16, as best seen in FIG. 3. The point of symmetry 16 is preferably indicated by a circle due to its ease of locating its center in the software, although other indicia, such as cross hairs and the like, may be used. The mirror image 10' would indicate that the article needs to be flipped over during machining. It is not necessary to maintain the mirror image representation 10' in its originally produced position, but may be manipulated on the display terminal, by conventional software means, as desired. Once all necessary views of the article have been developed on the video terminal, the set up design of the fixture can be initiated.

Figure 4:
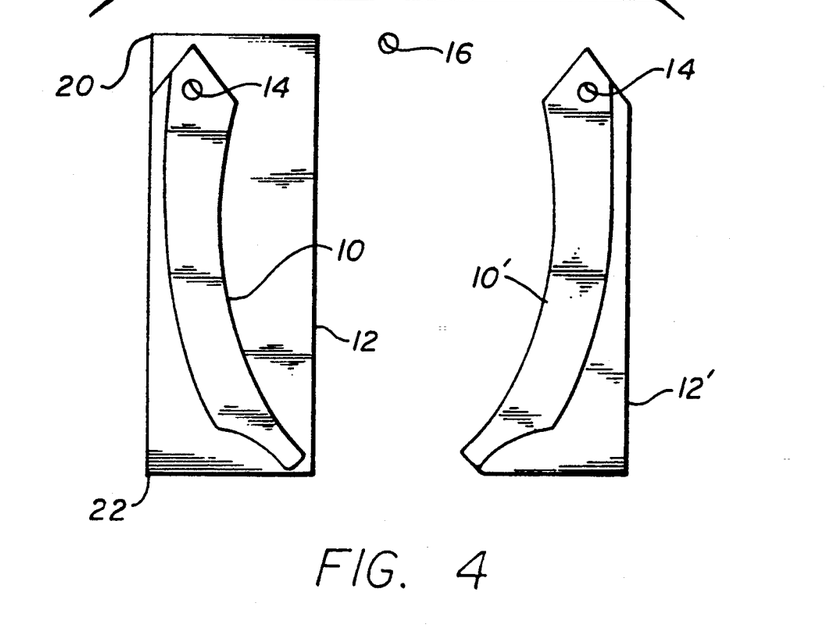
FIG. 4 is a view similar to FIG. 3 showing an addition of a video representation of tool cutting lines and partial machining of the workpiece.

With reference to FIG. 4, visual inspection of the video image 10 and first geometric shape 12 shows that the workpiece can be machined in two passes of the cutting tool. The first pass will remove workpiece stock from the right and top of the article. After the first pass the remaining workpiece material, which has been added to the display by the CAD software as best seen at 12', will appear as set forth adjacent the video mirror image 10'.

Figure 5:
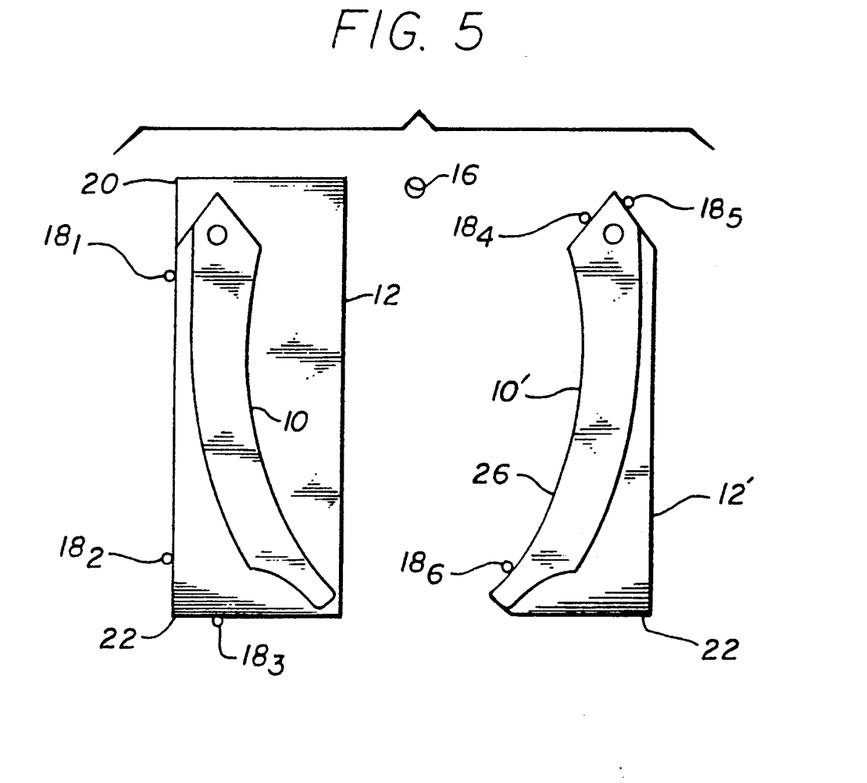
FIG. 5 is a view similar to FIG. 4 showing an addition of a video symbols of locating pins in a position selected to position the article to a fixture subplate.

In FIG. 5, there are shown circular video symbols $18_{1-6}$ of dowel pins which, when attached to the fixture subplate, will ensure the that the workpiece during the machining will be held in proper alignment. It is to be noted that the reference for defining the location of the dowel pins or the subplate has not yet been established. The operator need only intuitively place the video symbols $18_{1-6}$ at selected locations on the video display terminal where the actual dowel pins would not interfere with a machining pass, as shown in FIG. 4, acting on the workpiece yet be sufficient to locate the workpiece with respect to a frame of reference to be determined as described hereinbelow. The locating of the dowel pins with respect to the workpiece by placement of the video symbols $18_{1-6}$ adjacent the first geometric shape 12, video image 10 and mirror image 10' prior to any establishment of a frame of reference which precisely defines these locations is another feature of the part outward fixture setup. This feature has a distinct advantage over the prior art wherein the location of such devices is determined from a predefined fixture frame of reference independently of any machining pass with only a best guess being made where such devices will not interfere.

However, the circular video symbols $18_{1-6}$ of the dowel pins need to be precisely located adjacent the first geometric shape 12, video image 10 and mirror image 10' on the screen so that the CAD software can accurately determine the distance from the machine tool table reference origin (not yet defined on the terminal) and the center point of the dowel pins, for reasons as set forth in greater detail hereinbelow. It is this feature of the present invention which references the dowel pin, and other fixture device locations, from the machine table zero point which allows for the fixture subplate to be roughly positioned but accurately machined to position these devices during the fixture set up.

Typical CAD software allows for the relative straightforward placement of the circular video symbols $18_{1-3}$. For example, in software an (x,y) axis origin can be set at the upper left corner 20 of the first geometric shape 12. The circular video symbols $18_{1-2}$ can each be placed at a respective location $(x_1,y_1)$ and $(x_2,y_2)$ with respect to the (x,y) axis origin wherein x is the radius of the dowel pin and y is its position relative to the upper corner 20 of the workpiece. Similarly, the circular video symbol $18_3$ may placed by again setting an (x,y) axis origin at the lower left corner 22 of the geometric shape 12 and using software to place a circle at $(x_3,y_3)$ from the new origin wherein x is now the distance from the lower left corner 22 and y is the dowel pin radius. The CAD software would then compute the unscaled distance between the machine table zero reference (still not defined) and the $(x_1,y_1)$, $(x_2,y_2)$ and $(x_3,y_3)$ center point of the respective video symbol $18_{1-3}$.

Figure 6:
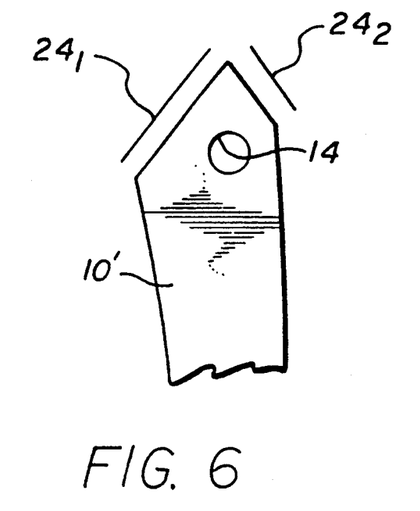
FIG. 6 is a view showing a detail of FIG. 5 useful for explaining the precision placement of the video symbols of the locating pins tangential to an adjacent surface.

Circular video symbols $18_{4-6}$, which are tangential with surfaces which are not parallel to either axis set hereinabove, may be placed by a slightly different method. For example, with reference to FIG. 6, the CAD software is used to generate a set of offset parallel lines $24_{1-2}$ adjacent the upper portion of the mirror image 10'. The spacing of the lines $24_{1-2}$ is selected to be commensurate with the unscaled radius of the dowel pins. The CAD software is then used to select the midpoint of the line, or any other convenient point, and place the center of the circular symbols $18_{4-5}$ at the selected point on lines $24_{1-2}$. Similarly, the arcuate contour 26 of the mirror image 10' may also be used to generate an open offset spaced therefrom by a distance commensurate with the dowel pin radius. A point on the open offset to place the circular symbol $18_6$ may then be selected.

It is to be recognized that the article, workpiece and dowel pins have now been exactly located with respect to each other through their respective video images and symbols 10, 12, 18. However, these orientations have not yet been referenced to any fixed machine table reference origin, nor has any fixture subplate been constructed.

Figure 7:
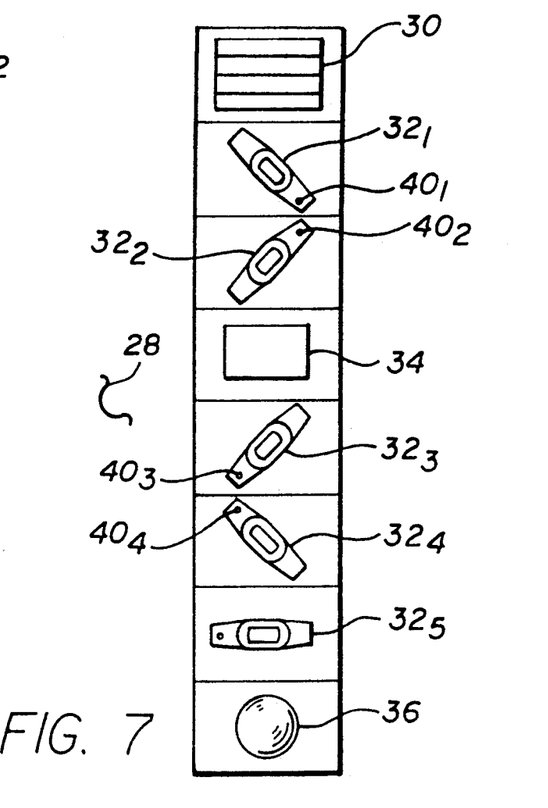
FIG. 7 is a view showing a video presentation of an exemplary library.

Referring to FIG. 7, there is shown a video representation 28 of a library, which is stored as digital data, in a pull down menu format, as is known in the art. The exemplary library contains a video representation 30 of a machine tool table, such as one commercially available from Bridgeport, and hardware devices particularly designed for such table such as the video symbols $32_{4-5}$ of clamps, video image 34 for a subplate and video symbol 36 for a tooling ball. The library may include several machine tool table types. It is the addition of the the library to the existing CAD/CAM software which allows those skilled in the art to practice the present invention of computer aided design and set up of the machine tool table fixture. This library may be compiled from data available from the various manufacturers of machine tools. The library need not be limited to the T-slot type table, as shown in video representation 30, but may also include modular tables and wire EDM tables.

Figure 8:
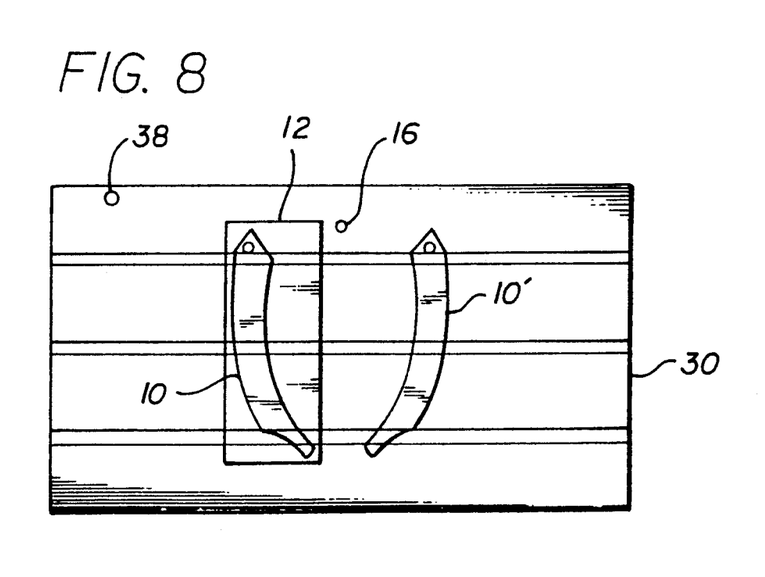
FIG. 8 is a view similar to FIG. 4 showing an addition of a video representation of a machine tool table selected from the library.

The particular machine tool table to be used in the machining of the article is selected from the menu 28 and its video representation, such as representation 30, is placed, by use of the CAD software, visually underneath and enclosing the video images 10, 12 of the article and workpiece, respectively, as best seen in FIG. 8. The video representation 30 of the machine tool table thus establishes a working boundary for further steps in the fixture set up. The video representation 30 of the machine tool table has a $(x,,y,z)$ reference origin 38 which precisely corresponds to the machine tool table zero reference.

Figure 9:
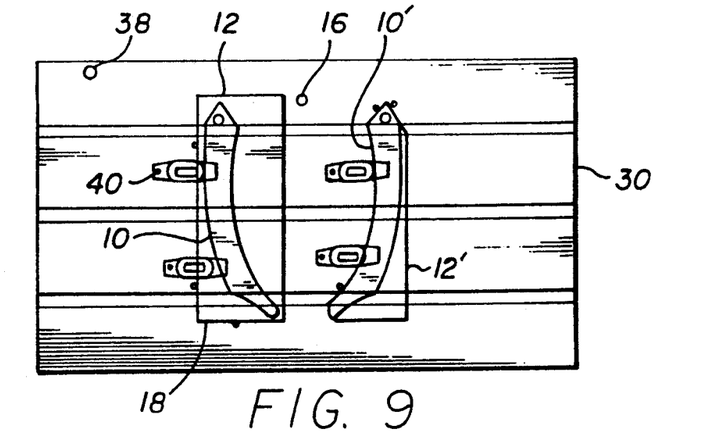
FIG. 9 is a view similar to FIG. 8 showing the details of FIG. 5 and an addition of video symbols of clamps selected from the library as they would be positioned on the workpiece and article during machining.

FIG. 9 shows that the clamp symbols $32_5$ have been selected from the library and visually positioned where they are to be attached to the fixture subplate. Note that the subplate has not yet been represented on the video display terminal. Each of the clamp symbols $32_{1-5}$ has a respective locating reference $40_{1-5}$ from which its position may be defined. The circular dowel pin symbols 18 have also been added to the display of FIG. 9 so that visual inspection may be used to provide for clearances between the clamps and dowel pins.

Figure 10:
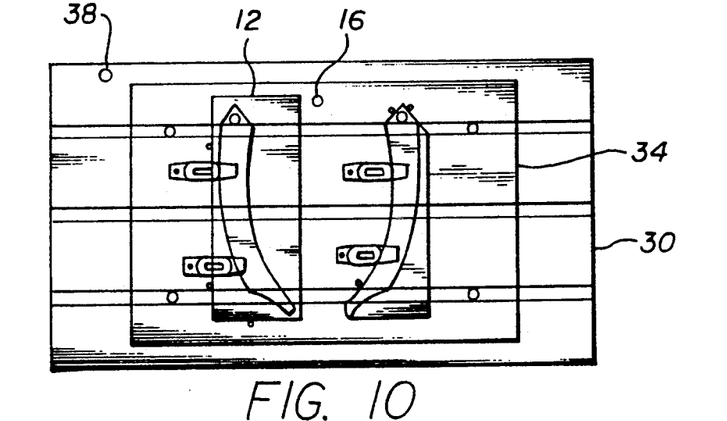
FIG. 10 is a view showing the video representation of FIG. 9 as enclosed by a second geometric figure which is useful for sizing the fixture subplate to which the workpiece and article will be attached during the machining sequence.
Figure 11:
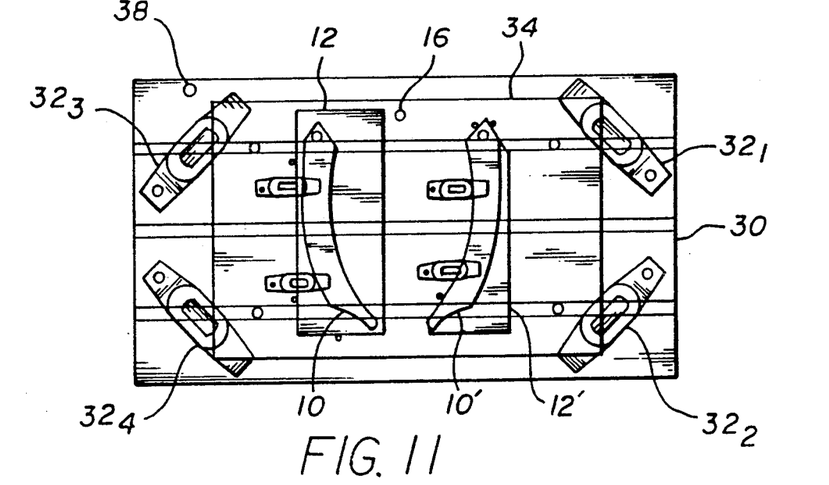
FIG. 11 is a view similar to FIG. 10 showing the addition of video symbols of clamps as they would be positioned to hold the subplate to the machine tool table.

Finally, in FIGS. 10–11 it is shown that the subplate representation 34 is brought into the video image on the display terminal by making the proper selection from the library 28 and positioning it where the bolt holes 42 align with T-slots 44. Alternatively, the subplate representation 34 may be made by forming a second geometric figure on the display terminal. Clamp representations $32_{1-5}$ are also brought into the display adjacent the subplate image 34 in a location selected to hold the actual subplate to the machine tool table. The actual subplate need only be sized approximately as to the dimensions calculated from the video image and approximately positioned as shown in the display.

The computer through the CAD software may now calculate the exact unscaled (x,y) distance from the machine table reference origin 38 to the center of each dowel pin symbol 18 and the reference point 40 for each clamp 32. The (x,y) data will be used the CAM software to generate the NC code to machine the subplate at each (x,y) data point in accordance with the type of device to be attached thereto. Therefore, the subplate need not be precisely sized and positioned prior to its machining. The location of all components used in the fixture have been defined in the CAD software from the machine table zero reference.

Figure 12A:
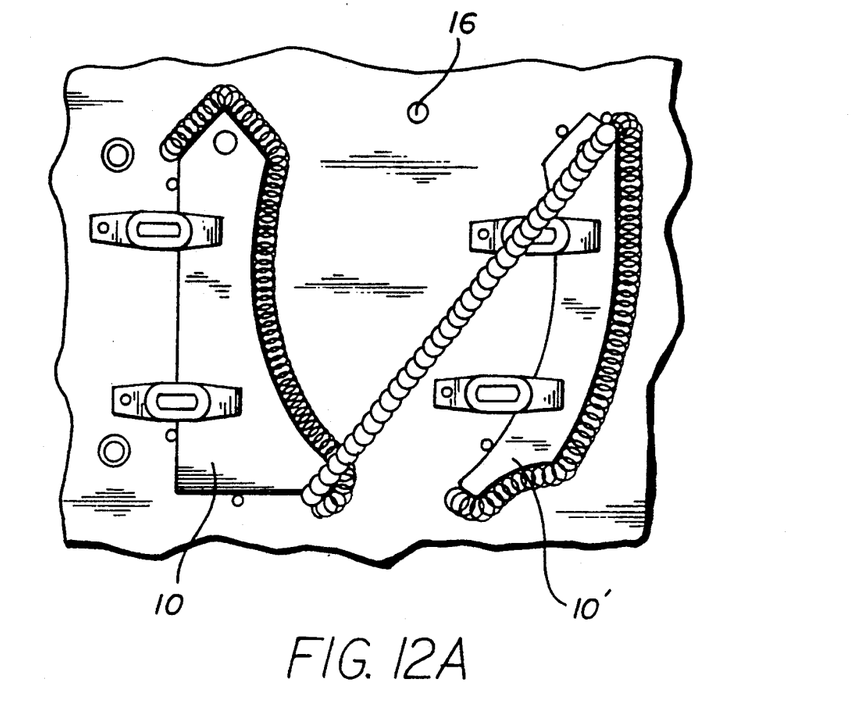
FIGS. 12A-12B is a view of the view useful for visually determining clearances with respect to the cutting path.
Figure 12B:
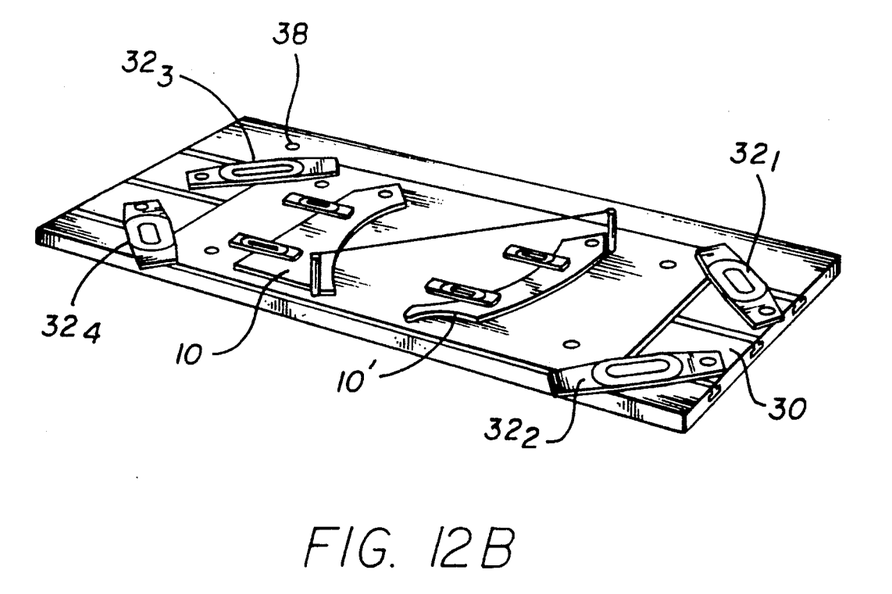

After the subplate has been machined and set up of the fixture has been completed using the video display, or a screen print, of FIG. 11 as a guide, the machining of the article may commence. If the video image 10 of the article has been obtained from data provided from the CAD/CAM software, the machining data in the CAM software is not yet referenced to the machine table origin 38. If the point of symmetry 16 is taken as the CAD/CAM reference (or part zero), the computer can also compute an exact offset from the machine table origin 38 to the symmetry point 16. The table numerical controller can now be programmed with this offset data to reference the machining data to the table origin 38. Furthermore, the display of FIG. 11 may be reorientated as a perspective, as shown in FIG. 12, to show the (x,y,z) path of the cutting tool to ensure that the fixture set up does not contain any collisions with any part of the fixture.

There has been described hereinabove a novel machine tool table computer aided setup method. Those skilled in the art may now make numerous uses of and departures from the above described embodiments without departing from the inventive concepts disclosed herein. Accordingly, the present invention is to be defined solely by the scope of the following claims.

We claim:

1. A method for the automated setup of a fixture on a machine tool table so that a machinable stock workpiece may be held by said fixture for machining to produce an article of manufacture, said method comprising steps of:

displaying a video of the article to be produced on a video display terminal of a computer;

forming through use of an input device of the computer a first geometric shape displayed by the terminal wherein the geometric shape displayed by the terminal fully encloses the video image, the first geometric shape providing approximate unscaled dimensions for the workpiece;

selecting from a library of known machine tool tables a scaled table video representation of the machine tool table contemplated for use to produce the article, the machine tool table having a predefined frame of reference origin included in the scaled table video representation;

displaying the scaled table video representation visually underneath each of the video image of the article and first geometric shape;

selecting from the library of known locating, fastening and holding devices a scaled device video symbol of each of such devices to be used during the machining sequence operable on the workpiece;

displaying each scaled device video symbol at a location of the first geometric shape or video image where each of such devices is to be disposed with respect to the workpiece and article during the machining sequence;

forming a video representation of a subplate fully enclosing the first geometric shape and further being enclosed by the table video representation, the subplate video representation providing approximate dimensions for the fixture and approximate location of the fixture on the machine tool table;

computing an unscaled (x,y) distance from the frame of reference origin to a predefined reference point within each device symbol to develop a set of (x,y) data; and utilizing the (x,y) data to machine a piece of material mounted to the machine tool table in the approximate unscaled dimension and location of the subplate video representation as displayed on the video display terminal, wherein the machining is performed in accordance with the type of device to be attached to the material at each (x,y) data point for the subsequent attachment of each of the devices and workpiece as displayed on the video display terminal.

2. A method as set forth in claim 1 wherein said video image displaying step includes the steps of:

displaying a selected number of views of the article in accordance with each orientation of the article during the machining sequence.

3. A method as set forth in claim 2 wherein said first geometric shape forming step is performed about only one of the selected number of views.

4. A method for the automated setup of a fixture on a machine tool table so that a machinable stock workpiece may be held by said fixture for machining to produce an article of manufacture, said method comprising steps of:

displaying a scaled video image of the article to be produced on a video display terminal of a computer, the data for such image being provided from CAD software data;

forming through use of an input device of the computer a first geometric shape displayed by the terminal wherein the geometric shape displayed by the terminal fully encloses the video image, the first geometric shape providing approximate unscaled dimensions for the workpiece;

selecting from a library of known machine tool tables a scaled table video representation of the machine tool table contemplated for use to produce the article, the machine tool table having a predefined frame of reference origin included in the scaled table video representation;

displaying the scaled table video representation visually underneath each of the video image and first geometric shape;

selecting from the library of known locating, fastening and holding devices a scaled device video symbol of each of such devices to be used during the machining sequence operable on the workpiece;

displaying each scaled device video symbol at a location of the first geometric shape or video image where each of such devices are to be disposed with respect to the workpiece and article during the machining sequence;

forming a subplate video representation fully enclosing the first geometric shape and further being enclosed by the table video representation, the second geometric shape providing approximate dimensions for the fixture and approximate location of the fixture on the machine tool table;

computing an unscaled (x,y) distance from the frame of reference origin to a predefined reference point for each device representation to develop a set of (x,y) data;

developing the NC code, using CAM software, to machine the subplate from the (x,y) data;

mounting to the machine tool table a piece of machinable material in the approximate unscaled dimension and location of the subplate video representation as displayed on the video display terminal; and machining the material in accordance with the (x,y) data and the type of device to be attached to the material at each (x,y) data point and attaching the devices and workpiece as displayed on the video display terminal so that machining of the workpiece can be initiated.

5. A method as set forth in claim 4 wherein said video image displaying step includes the steps of:

displaying a selected number of views of the article in accordance with each orientation of the article during the machining sequence.

6. A method as set forth in claim 5 wherein said first geometric shape forming step is performed about only one of the selected number of views.

* * * * *